United States Patent [19]

Mese et al.

[11] 4,371,146

[45] Feb. 1, 1983

[54] BALL VALVE

[75] Inventors: Hisayoshi Mese, Taishibashi; Shigeo Kanaya, Suita, both of Japan

[73] Assignee: Fuji Metal Mfg. Co., Ltd., Osaka, Japan

[21] Appl. No.: 247,396

[22] Filed: Mar. 25, 1981

[30] Foreign Application Priority Data

Mar. 25, 1980 [JP] Japan .................................. 55-38497

[51] Int. Cl.³ .......................... F16K 5/10; F16K 47/04
[52] U.S. Cl. ................................. 251/209; 137/614.17
[58] Field of Search ............................. 251/207, 209; 137/614.17

[56] References Cited

U.S. PATENT DOCUMENTS

| 2,707,971 | 5/1955 | Lamar | 137/614.17 X |
| 3,146,792 | 9/1964 | Donnelly et al. | 137/614.17 |
| 3,386,461 | 6/1968 | Fisher | 251/207 X |
| 3,707,161 | 12/1972 | Crawford | 137/614.17 X |
| 4,111,229 | 9/1978 | Christian | 251/209 X |
| 4,130,128 | 12/1978 | Kaneko | 251/207 X |
| 4,226,263 | 10/1980 | Muchow | 137/614.17 |

FOREIGN PATENT DOCUMENTS 8104 of 1885 United Kingdom ........... 137/614.17

Primary Examiner—Arnold Rosenthal

Attorney, Agent, or Firm—Armstrong, Nikaido, Marmelstein & Kubovcik

[57] ABSTRACT

A ball valve is provided with a valve case forming an internal space that is centrally extending to opposite inlet and outlet sides. A ball valve element is disposed within the interior space and has a bore extending therethrough, a valve seat rotatably supports the ball valve element and a valve stem is fixed to one side of the ball valve element and has an operating lever at one end of the valve stem projecting therefrom outside the valve case. A flow adjusting internal valve assembly means is provided in the bore which comprises an internal cylindrical valve casing in the bore with an internal valve seat portion, and an axially movable internal valve element disposed within the internal cylindrical valve casing. The internal cylindrical valve casing comprises an internally threaded large-diameter portion at its inlet side, a small-diameter guide bore portion at its outlet side and an intermediate portion positioned therebetween, having a tapered inner surface providing the internal valve seat portion. The internal valve element comprises an externally threaded head screwed in the internally threaded portion and a cylindrical leg extending from one end of the head toward the outlet side and inserted into the guide bore portion, the head being formed with a slanting fluid channel, the leg having a slanting surface opposed to the internal valve seat portion.

5 Claims, 2 Drawing Figures

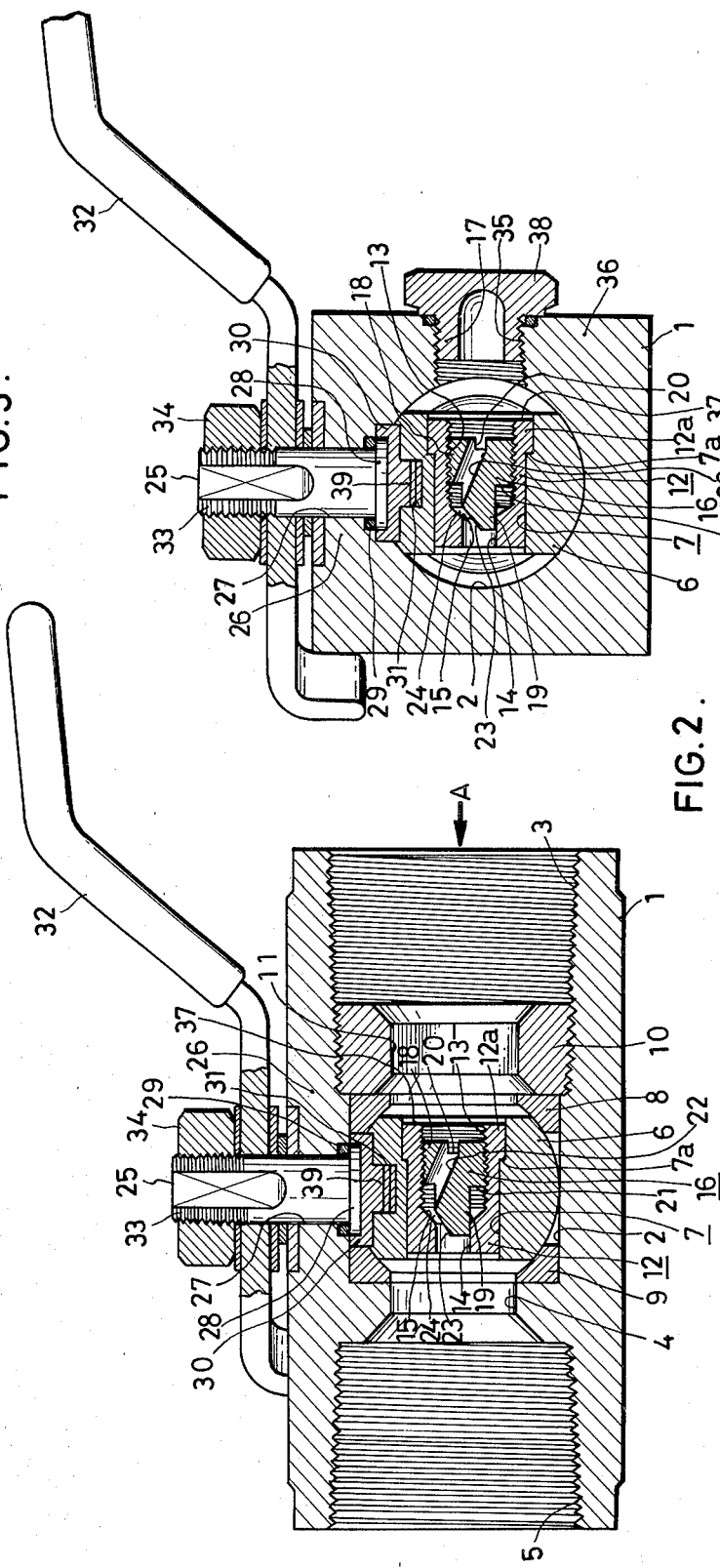

BALL VALVE

BACKGROUND OF THE INVENTION

The present invention relates to a ball valve comprising a valve case and a ball valve element disposed in the case and turnable for controlling the flow of fluid through the valve.

For controlling the flow rate of a fluid with a ball valve, the ball valve element within the case of the valve is usually turned by a lever through the valve stem to alter the direction of the flow channel extending through the ball valve element. Accordingly the lever must be operated very delicately for the fine adjustment of the flow rate. Such delicate manipulation of the lever is very cumbersome, while the flow is not always adjustable accurately by operating the lever.

SUMMARY OF THE INVENTION

The main object of this invention is to overcome the above drawbacks of conventional ball valves and to provide a ball valve for finely adjusting the flow of fluid easily and accurately.

The present invention provides a ball valve which comprises a valve case having an interior space in its center and open at its opposite ends, a ball valve element disposed within the interior space and having a horizontal bore extending therethrough, a valve seat rotatably supporting the ball valve element, a valve stem fixed to the top of the ball valve element and having an operating lever at one end thereof projecting outward from the valve case, and a flow adjusting internal valve assembly provided in the horizontal bore.

The internal valve assembly comprises an internal cylindrical valve casing fixed in the horizontal bore and having an internal valve seat portion, and an internal valve element axially movably disposed within the internal valve casing. This casing comprises an internally threaded large-diameter portion at its inlet side, a small-diameter guide bore portion at its outlet side and an intermediate portion positioned therebetween and having a tapered inner surface providing the internal valve seat portion, and the internal valve element comprises an externally threaded head screwed in the internally threaded portion and a cylindrical leg extending from one end of the head toward the outlet side and inserted into the guide bore portion, the head being formed with a slanting fluid channel, the leg having a slanting surface opposed to the internal seat portion. The head has a screwdriver fitting groove in the other end face thereof.

Further with the ball valve of this invention, the valve case is formed in a side wall thereof with a bore for passing therethrough a rod for operating the internal valve assembly. The side wall bore is positioned in opposed relation to the grooved end face of the internal valve element when the ball valve element is in its fully closed position. The side wall bore is closed with a detachable plug.

The flow through the valve can be roughly adjusted by turning the ball valve element with the lever. Further the flow is finely adjustable easily and accurately by turning the internal valve element with a screwdriver fitted in the fitting groove to axially move the internal valve element and thereby increase or decrease the width of a flow adjusting channel formed between the internal valve seat portion and the slanting surface.

Because the ball valve has the foregoing construction, the flow rate is adjustable much more delicately and finely than heretofore possible. Additionally the flow is adjustable delicately without the necessity of discharging the fluid from the piping and with the ball valve itself as connected thereto. Thus the ball valve of this invention is epoch-making it that it will find novel application.

BRIEF DESCRIPTION OF THE DRAWINGS

FIG. 1 is a view in longitudinal section of a ball valve of this invention in its fully opened state;

FIG. 2 is a plan view showing an internal valve element; and

FIG. 3 is a view in cross section showing the ball valve in its fully closed state.

DESCRIPTION OF THE PREFERRED EMBODIMENT

The ball valve of this invention shown in FIGS. 1 and 2 has a tubular valve case 1 which is formed in its center with an internal space 2 circular in cross section. The internal space 2 is in communication with an internally threaded portion 3 positioned at the inlet side of the case 1 and having a larger diameter for connection to a pipe. At the outlet side of the case, the space 2 communicates with an internally threaded portion 5 via a small-diameter channel 4. The portion 5 is also adapted for connection to another pipe.

A ball valve element 6 disposed within the internal space 2 has a horizontal bore 7 extending centrally therethrough. The bore 7 has an inlet portion of larger diameter to provide a stepped portion 7a.

Indicated at 8 and 9 are annular valve seats. The ball valve element 6 is rotatably supported by the concave inner surfaces of the seats.

Indicated at 10 is an externally threaded member for adjusting the degree of contact between the ball valve element 6 in the space 2 and the pair of valve seats 8, 9. The adjusting member 10 has in its center a flow channel 11 which is hexagonal in cross section. The member 10 is screwed in the internally threaded portion 3 by being turned with a tool, such as a spanner, fitted into the flow channel 11.

An internal valve casing 12 is press-fitted in the bore 7 from the outlet side and has a large-diameter inlet end 12a in engagement with the stepped portion 7a of the bore 7. The internal valve casing 12 comprises an internally threaded large-diameter portion 13 at its inlet side, a small-diameter guide bore portion 14 at its outlet side and an internal valve seat portion 15 positioned therebetween and having a tapered inner surface.

FIG. 2 shows an internal valve element disposed within the internal valve casing 12 and comprising an externally threaded head 18 and a cylindrical leg 19 extending from the outlet end of the head 18. The head 18 has at its inlet side an operating end face 37 formed with a screwdriver fitting groove 20 extending through the center of the end face. The head 18 is internally formed with a slanting fluid channel 22 extending from the center of the operating end face 37 toward a stepped portion 21 provided by the head 18 and the leg 19. The leg 19 is cut away at one side of its forward end portion to provide a slanting surface 23 opposed to the internal valve seat portion 15 and extending from the outlet of the fluid channel 22 to the center of the forward end face of the leg 19. The internal valve element 16 so constructed has its head 18 screwed in the internally threaded portion 13 and its leg 19 inserted in the guide bore portion 14. Thus the valve element 16 is axially movable within the internal valve casing 12. A flow adjusting channel 24 is formed between the internal valve seat portion 15 and the slanting surface 23. The width of the channel 24 is adjustable by the axial movement of the internal valve element 16. The internal valve casing 12 having the valve seat portion 15 and the internal valve element 16 constitute an internal valve assembly for adjusting the flow through the ball valve.

A valve stem 25 rotatably extending through a vertical bore 27 in the top wall 26 of the valve case 1 has at its lower end a flange 28 which is positioned inside the top wall 26. An O-ring 29 surrounding the valve stem 25 at the lower end of the vertical bore 27 is interposed between the flange 28 and the top wall 26. A dish-shaped fixing member 30 holds the lower end of the valve stem 25 to the top of the ball valve element 6 and has a lower projection 39 which is square in cross section. A vertical cavity 31, similarly square in cross section, is formed in the top of the ball valve element 6. The flange 29 is fixedly fitted in the fixing member 30, with the projection 39 intimately fitted in the cavity 31. In this way, the valve stem 25 is secured to the ball valve element 6 by the fixing member 30.

An operating lever 32 is fastened by a nut 34 to an externally threaded upper end portion 33 of the valve stem 25 projecting upward from the top wall 26.

With reference to FIG. 3, the valve case 1 is formed in a side wall 36 thereof with a threaded bore 35 for passing therethrough a rod for operating the internal valve assembly. When the ball valve element 6 is in its fully closed position, the operating end face 37 of the internal valve element 16 opposes the bore 35. The threaded bore 35 has such a size that the internal valve element 16 can be passed therethrough easily. A plug 38 for closing the threaded bore 35 has at its forward end an externally threaded portion 17 which is detachably screwed in the bore 35.

The ball valve of this invention will be used in the following manner.

When the ball valve element 6 is in its fully opened position as seen in FIG. 1, the fluid flowing in the direction of an arrow A shown passes through the channel 11 of the adjusting threaded member 10 into the fluid channel 22 of the internal valve element 16, from which the fluid flows out toward the small-diameter channel 4 via the flow adjusting channel 24. The flow is roughly adjusted by turning the ball valve element 6 with the operating lever 32.

The flow is finely adjusted in the following manner.

First, the fluid is discharged from the piping channel, and the ball valve itself is removed from the piping. With the ball valve element 6 then turned to its fully opened position with the lever 32, a straight-edged screwdriver is inserted into the ball valve through the inlet threaded portion 3 to fit the end of the driver into the groove 20 of the internal valve element 16. The valve element 16 is then turned to advance or retract the same, whereby the width of the flow adjusting channel is increased or decreased. After the width of the channel has been thus adjusted, the ball valve itself is connected to the piping to measure the flow rate. This procedure is repeated several times to afford the desired flow rate accurately.

When the flow rate thus set need not be altered for a long period of time, the above method is fully useful, but when there is a need to vary the flow rate frequently, this method is inconvenient because the ball valve must be removed and then reinstalled every time the adjustment is made. In such a case, the flow rate is adjusted by the following procedure. First, with the ball valve element 6 turned to its fully closed position by the lever 32, the plug 38 is removed from the threaded bore 35, a screwdriver is then inserted into the valve through the bore 35 and the driver end is fitted into the groove 20 to turn the internal valve element 16 in the same manner as above. After the width of the flow adjusting channel 24 has been adjusted, the bore 35 is closed with the plug 38 again, the ball valve element 6 is returned to its fully opened position and the flow rate is measured. This procedure is similarly repeated several times to give the desired flow rate accurately. Since the ball valve element is in its fully closed state when the internal valve element 16 is operated by the latter method, the method does not require the cumbersome procedure of discharging the fluid from the piping or removing the ball valve itself from the piping.

The screwdriver fitting groove may be cross-shaped, in which case it is preferable to use a cross-ended (Phillips) screwdriver.

What is claimed is:

1. A ball valve, comprising a valve case forming an internal space that is centrally extending to opposite inlet and outlet sides, a ball valve element disposed within the interior space and having a bore extending therethrough, a valve seat rotatably supporting the ball valve element, a valve stem fixed to one side of the ball valve element and having an operating lever at one end of the valve stem projecting therefrom outside the valve case, and a flow adjusting internal valve assembly means provided in the bore, comprising an internal cylindrical valve casing in the bore and having an internal valve seat portion, and an axially movable internal valve element disposed within the internal cylindrical valve casing, wherein the internal cylindrical valve casing comprises an internally threaded large-diameter portion at its inlet side, a small-diameter guide bore portion at its outlet side and an intermediate portion positioned therebetween and having a tapered inner surface providing the internal valve seat portion, and the internal valve element comprises an externally threaded head screwed in the internally threaded portion and a cylindrical leg extending from one end of the head toward the outlet side and inserted into the guide bore portion, the head being formed with a slanting fluid channel, the leg having a slanting surface opposed to the internal valve seat portion.

2. A ball valve as defined in claim 1 wherein a flow adjusting channel is provided between the internal valve seat portion and the slanting surface, and the width of the flow adjusting channel is adjustable by the axial movement of the internal valve element.

3. A ball valve as defined in claim 1 wherein the head has a screwdriver fitting groove in the other end face thereof.

4. A ball valve as defined in any one of claims 1 to 3 wherein the valve case is formed in a side wall thereof with a bore for passing therethrough a rod for operating the internal valve assembly, the side wall bore being positioned in opposed relation to the grooved end face of the internal valve element when the ball valve element is in its fully closed position, the side wall bore being closed with a detachable plug.

5. A ball valve as defined in claim 4 wherein the side wall bore is a threaded bore and the plug has an externally threaded portion.

* * * * *